United States Patent [19]

Collins et al.

[11] 4,200,201

[45] Apr. 29, 1980

[54] MACHINE HAVING MODULE WITH CARRIAGE FOR ADVANCING ROW OF ARTICLES

[75] Inventors: Robert J. Collins, Venice; Richard R. Stutsman, Mount Baldy; Theodore C. Youngkin, North Hollywood, all of Calif.

[73] Assignee: Rod Pierce and Associates, Marina del Rey, Calif.

[21] Appl. No.: 913,560

[22] Filed: Jun. 8, 1978

Related U.S. Application Data

[63] Continuation-in-part of Ser. No. 762,113, Jan. 24, 1977, Pat. No. 4,134,520.

[51] Int. Cl.[2] .............................................. B65G 35/04

[52] U.S. Cl. .................................... 221/129; 221/198; 221/227; 221/155

[58] Field of Search ............... 221/281, 123, 124, 125, 221/126, 227, 232, 198, 155, 226, 279, 129; 186/11; 185/37, 39, 45

[56] References Cited

U.S. PATENT DOCUMENTS

| | | | |
|---|---|---|---|
| 2,672,216 | 3/1954 | Gokey | 185/45 X |
| 2,784,872 | 3/1957 | Lux | 221/230 X |
| 3,542,244 | 11/1970 | Dyer et al. | 221/227 |
| 4,043,483 | 8/1977 | Gore et al. | 221/198 X |

*Primary Examiner*—Stanley H. Tollberg
*Attorney, Agent, or Firm*—Fulwider, Patton, Rieber, Lee & Utecht

[57] ABSTRACT

A dispensing machine in which a carriage moves articles along the horizontal floor of a module toward a releasing mechanism by which the articles are dispensed one at a time. The carriage includes a drive wheel that engages a track on the module floor, the wheel being driven by a spring mounted on and carried by the carriage. Rollers on the sides of the carriage ride in guide channels on the sides of the module to hold the wheel in firm contact with the track so that the spring is wound when the carriage is pushed back within the module and the carriage is advanced as the spring unwinds. The module is open along the top so that articles can be inserted between the carriage and the releasing mechanism.

A plurality of such modules are mounted on horizontally movable drawers that can be withdrawn from a cabinet for loading while a latch restrains each carriage at the rear of the module during loading. When the machine is used to dispense cigarettes, a window panel at the front of each module can permit tax stamps on the bottom ends of packages to be viewed. Since the spring is contained by the carriage, it does not obscure the stamps.

24 Claims, 8 Drawing Figures

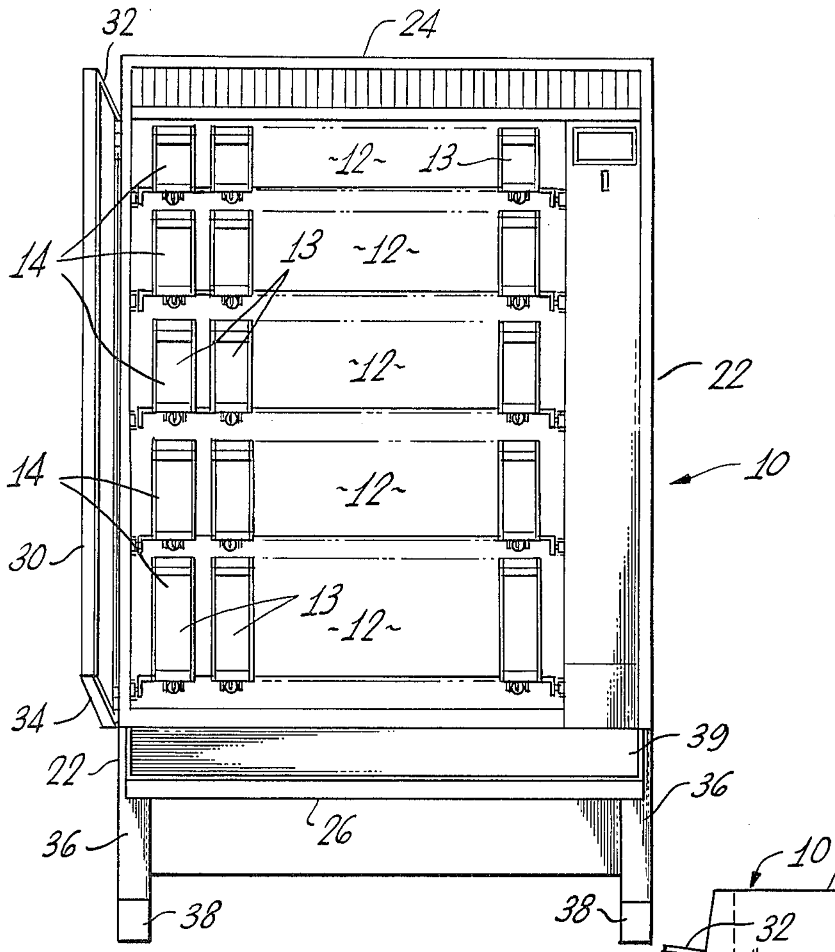
Fig. 1
Fig. 2
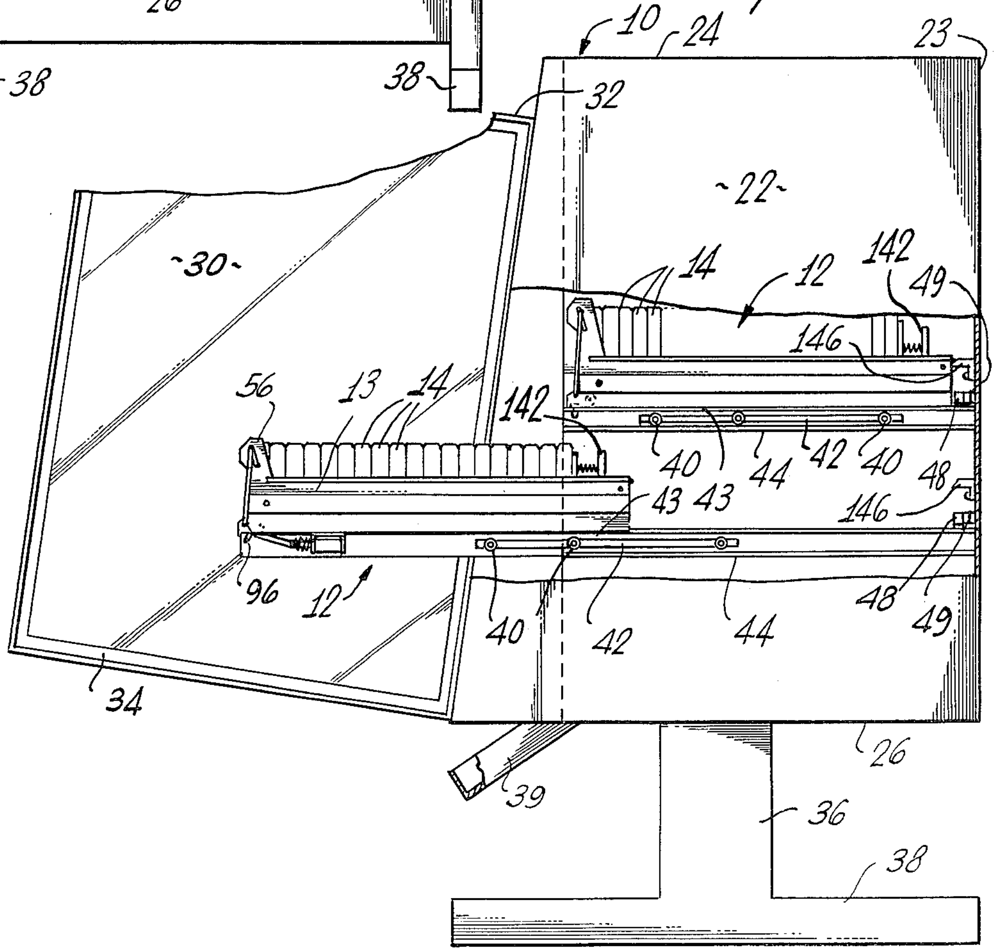

MACHINE HAVING MODULE WITH CARRIAGE FOR ADVANCING ROW OF ARTICLES

RELATED APPLICATIONS

This is a continuation-in-part of application Ser. No. 762,113, now U.S. Pat. No. 4,134,520, entitled ARTICLE DISPENSING MACHINE and filed on Jan. 24, 1977.

BACKGROUND OF THE INVENTION

The present invention relates to dispensing machines, and more particulary to a machine that can be actuated to dispense articles one at a time.

A variety of article dispensing machines are known, particularly in the form of vending machines commonly used to dispense cigarettes, food products, soap, novelties and the like. These machines are most often of the gravity feed type in which the articles are stacked in columns within vertical or inclined slots and a releasing mechanism selectively allows articles at the bottom to be dispensed when actuated by a mechanical linkage or solenoid. In the case of a vending machine, there is a provision for disabling the releasing mechanism until a predetermined quantity of coins has been inserted.

Dispensing machines are often used at widely scattered locations, where route men reload them and collect the money that has been deposited. Other such machines are grouped together in stores, where they are used in preference to conventional counter displays because they prevent theft and reduce the need for sales clerks, although this latter use has been less common.

However they may be deployed, dispensing machines should maximize the quantity of product stored in relation to the size of the machine to make optimum use of the available area and minimize the frequency with which reloading is necessary. Many presently known gravity feed machines utilize a relatively small portion of their total volume for the storage of products, and the inclined or vertical arrangement of the slots sometimes limits the variety of products that can be dispensed by a relatively tall machine that takes up a minimum of floor space. Another drawback of conventional gravity feed machines is that they often do not permit the article being dispensed to be viewed directly. Moreover, purchasers may be reluctant to use a vending machine if they cannot view the particular article to be dispensed and be assured that the machine is not empty.

Some efforts to improve upon gravity feed dispensing machines have led to arrangements in which the articles to be dispensed are moved horizontally toward dispensing positions by conveyor belts. While these belt-type machines may permit the user to view the article to be dispensed, they are generally complex and often contain only a relatively small amount of product in relation to their size.

Other previously known machines have arranged the articles to be dispensed in replaceable horizontal modules, the articles being inserted in the modules from the front, pushing back a movable wall or bumper and thereby compressing a spring that feeds the articles toward the front of the trough as they are dispensed. In other such machines, springs have been attached at the front of the module to pull the wall forward as the articles are dispensed. Regardless of which spring arrangement is used, if the articles are both loaded and dispensed from the front of the module, an article placed in the machine first will remain there until the module is completely empty. Where the freshness of the articles is important, as in the case of cigarettes or food products, it is particularly desirable that the articles inserted first be dispensed first, and the first-in-last-out arrangement of the front loading machines is unsatisfactory.

Another important disadvantage of previously known spring feed dispensing machines is that the spring force feeding the articles varies with the number of articles remaining in the machine. If the spring is strong enough to smoothly feed articles to a releasing mechanism at the front of the module when the machine is nearly empty, then it tends to crush the articles when full. The crushed articles are not only subject to possible damages, but, due to their reduced width, are sometimes dispensed two at a time instead of one at a time when the machine is actuated.

Principal objectives of the present invention are to overcome the above disadvantages of conventional article dispensing machines, and to obtain certain other advantages of simplicity, ease of assembly, economy and low maintenance. Another objective is to provide a machine for dispensing cigarette packages, in particular, in which the construction of the machine permits the tax stamps on the packages to be viewed without removing the packages from the machine.

SUMMARY OF THE INVENTION

The present invention, which uniquely accomplishes many of the above objectives, resides in a dispensing machine in which articles to be dispensed are advanced along a module toward a releasing mechanism by a carriage that is driven by a self-contained spring. The machine can be assembled at a minimum cost since the spring, being mounted on the carriage, and need not be separately attached to the module.

In a preferred form of the invention, a track formed by gripping deformations extends along the floor of the module and the carriage includes a drive wheel having a deformable outer layer that engages the track. Guide rollers carried by the carriage ride in channels on the sides of the module and force the drive wheel downwardly to firmly engage the track. As the carriage is pushed to the rear of the module it tensions the spring which is formed by a spiral metal tape. The spring is drivingly connected to the wheel to provide the necessary force to advance the carriage, pushing the articles before it, when the releasing mechanism is operated. Spring force remains constant despite changes in the position of the carriage.

According to another aspect of the invention, an article dispensing machine includes a cabinet and a plurality of drawers movable between an operating position within the cabinet and a loading position projecting from the cabinet, each drawer supporting a plurality of parallel substantially horizontal modules. Carriages advance the articles to be dispensed along the floors of the modules in the manner explained above. The modules are open-topped so that, with the drawers pulled out into their loading positions, the carriages can be pushed to the rears of the modules and the articles freely inserted from above. It should be noted that newly inserted articles can then be readily positioned behind the articles already in the machine so that the oldest articles are dispensed first.

To facilitate loading, a latching mechanism can be provided for retaining the carriages at the rear portions of the modules. A preferred form of the latch mechanism includes a pivotable member attached to each carriage that releasebly engages a fixed member extending across the module. An unlatching device can be provided which automatically releases all the latching mechanisms when the drawers are returned to their operating positions. This unlatching device may be formed by a plurality of abutment surfaces supported by the cabinet which engages the latching mechanism in response to drawer movement. Not only is the unlatching device a convenient feature which makes it unnecessary for the person loading the machine to individually unlatch the carriages, but it insures that carriages will not inadvertently be left in a latched, i.e., non-operational, condition.

Still another aspect of the machine relates to the provision of a window in the floor of each module adjacent the releasing mechanism. This window permits the tax stamps on cigarette packages nearest the releasing mechanism to be viewed without taking the packages out of the machine. It should be noted that the use of a self-contained carriage spring is advantageous when combined with the provision of the window since the spring does not block any portion of the window.

Another aspect of the invention relates to the unique features of its construction which permit articles to be viewed from outside the machine before they are dispensed. The machine can be provided with an openable transparent front door positioned so that the releasing mechanisms oppose the door when the machine is operational. Each releasing mechanism has an open front end which permits the lead article to be viewed through the transparent door.

Other features and advantages of the present invention will become apparent from the following detailed description, taken in conjunction with the accompanying drawings which illustrate, by way of example, the principles of the invention.

BRIEF DESCRIPTION OF THE DRAWINGS

FIG. 1 is a front view of a dispensing machine constructed in accordance with the invention, shown with the cabinet door in an open position;

FIG. 2 is a partially broken away side view of the dispensing machine, shown with the door open and one of the drawers in its loading position;

DESCRIPTION OF THE PREFERRED EMBODIMENT

Figure 3:
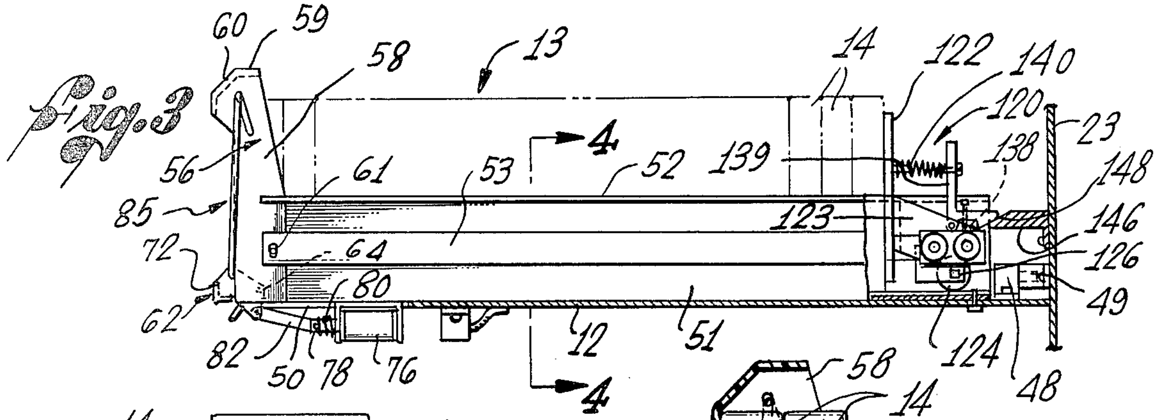
FIG. 3 is an enlarged, partially broken away, plan view of one module of the machine.

An exemplary apparatus, illustrated in FIGS. 1–8 of the accompanying drawings, embodies many novel aspects of the present invention. In general, the apparatus includes a metal cabinet 10 of conventional construction which houses drawers 12 that are stacked, one above the other, each drawer forming the floor of a compartment that contains a plurality of parallel horizontal modules 13 positioned side-by-side and extending from front to back. Articles 14 to be dispensed are arranged in the modules 13, one behind the other, in rows and moved along the modules toward the front ends of the drawers 12 where they are released, as explained more fully below.

Although a wide variety of articles 14 such as food products, drinks, soap, tape cassettes, and novelties can be dispensed by apparatus constructed according to many aspects of the invention, this exemplary apparatus is particularly well suited for dispensing packages of cigarettes which are used here by way of example. The cabinet 10, as shown in FIGS. 1 and 2, is a generally rectangular box-like structure having two vertical sides 22, a vertical back wall 23, and a horizontal top 24 and bottom 26. An openable transparent glass or plastic door 30 on the front of the cabinet 10 is hinged to the left-hand sidewall 22 and inclined slightly from the vertical so that in the closed position (not illustrated) its top edge 32 is set back from its leading bottom edge 34. The cabinet 10 is supported at either side by short vertical columns 36 that project upwardly from a base 38. A tray 39 extends along the front of the cabinet 10 beneath the closed door 30 to catch the articles 14 as they are dispensed.

Each of the drawers 12 rides on rollers 40 that are mounted on flat metal rods 42. As best shown in FIG. 2, the drawers 12 have horizontal guides 43 on either side forming downwardly facing grooves of U-shaped cross section that engage the rollers 40 from above, and the rollers in turn ride on upwardly facing grooves of similar U-shaped cross section formed by tracks 44 on the inside surface of the cabinet side walls 22. The rods 42, guides 43 and tracks 44 combine telescopically, in a conventional manner so that the drawers 12 can slide from a fully closed operative position to a fully extended loading position. Electrical jacks 48 carried by the drawers 12 mate with corresponding female receptacles 49 on the back wall 23 of the cabinet 10 when the drawers are moved to their operating positions, as can be seen in the broken-away portion of FIG. 3.

Figure 4:
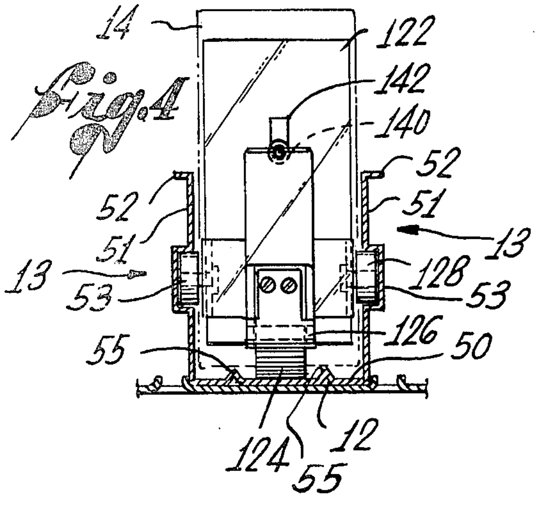
FIG. 4 is a further enlarged cross sectional view of the module taken along the line 4—4 of FIG. 3.

Each article carrying module 13 is mounted on the corresponding drawer 12 in such a manner that it extends from the back wall 23 of the cabinet 10 toward the door 30. As best shown in FIGS. 3 and 4, the module 13 is trough-like formed by an elongated, roll formed, sheet metal member of generally U-shaped cross section with a flat floor 50, upstanding sidewalls 51, and narrow outwardly bent stiffening flanges 52 along the upper edges of its side walls. The top of the module 13 is completely open from front to back so that the articles 14 can be inserted easily.

Inwardly facing, rectangular, horizontal guide channels 53 are formed on the sidewalls 51. On the floor 50 of the module 13 is a knurled track 54 that extends longitudinally along the center of the module toward the front of the machine. Two parallel ridges 55 of inverted V-shape cross section extend along the sides of the track 54.

At the front end of the module 13, nearest the cabinet door 30, is a releasing mechanism 56 (FIGS. 1, 3, 6, 7, and 8) for dispensing the articles 14 sequentially. The releasing mechanism 56, includes a box-like plastic form (FIG. 6) about half again as tall as the module 13 having vertical sides 58, a horizontal top 59, and a cowl 60 extending downwardly from the top. The forward extremities of the module flanges 52 are received by horizontal slots in the sides 58, thereby helping to position the releasing mechanism 56.

The vertical surface of each guide channel 53 embraces the outside of the corresponding releasing mechanism side 58 and includes a small aperture that receives a lug 61 projecting outwardly from the side. A detent mechanism is thus formed by the cooperation of each lug 61 and its aperture and the releasing mechanism can be installed and later removed for service by simply flexing the releasing mechanism side 58 inwardly to disengage the lugs from their apertures. In the event that articles 14 of a different height are to be dispensed, the releasing mechanism 56 is easily replaced by one of the appropriate size.

Figure 7:
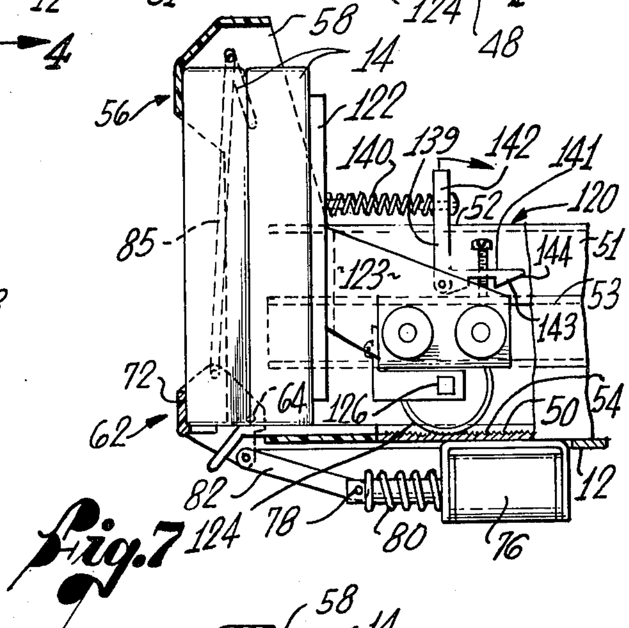
FIG. 7 is an enlarged, fragmentary, side view of the forward portion of the module, showing the releasing mechanism in its normal position.
Figure 5:
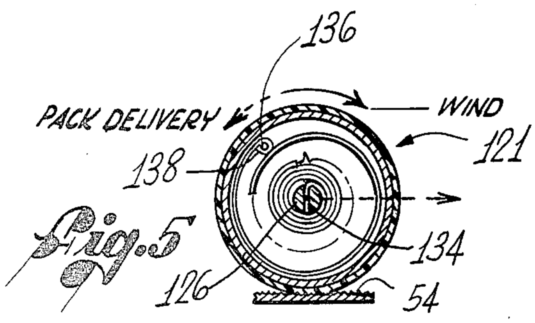
FIG. 5 is an enlarged, fragmentary, cross-sectional view of a portion of the carriage, showing the drive wheel and spring and a portion of the track.
Figure 8:
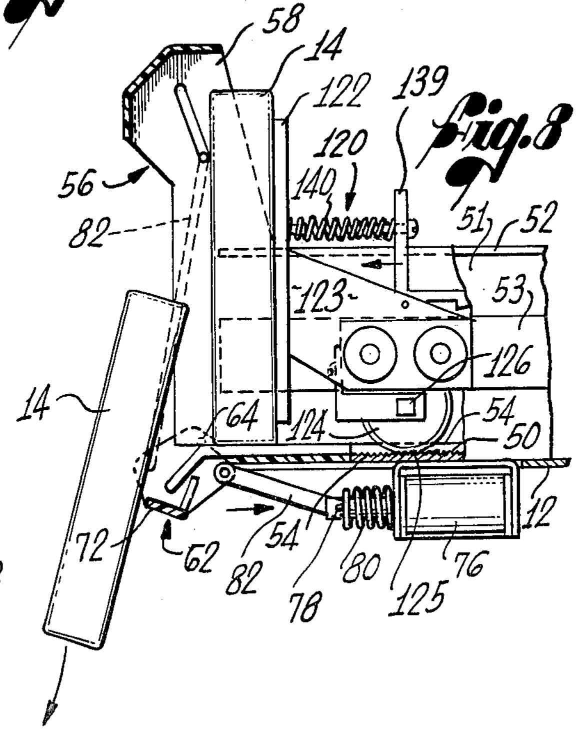
FIG. 8 is another fragmentary side view, similar to FIG. 7, showing the releasing mechanism in its releasing position with an article being dispensed.
Figure 6:
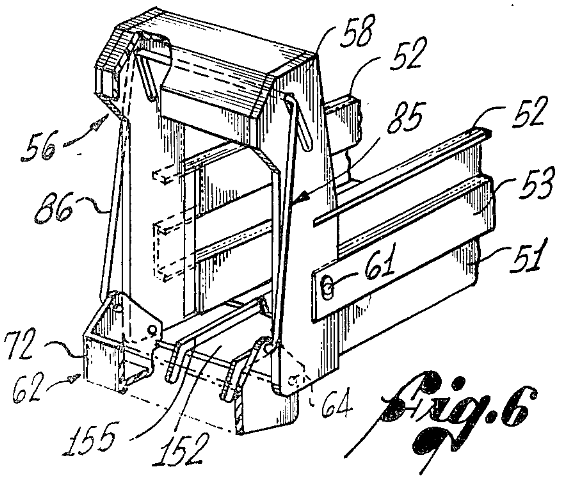
FIG. 6 is an enlarged, fragmentary, three-dimensional view of the machine showing the releasing mechanism and a fragmentary portion of a module.

At the bottom of the releasing mechanism 56 is a movable retaining member 62 mounted by pivot pins 64 that project outwardly therefrom to be received in openings in the sidewalls 58 of the releasing mechanism as best shown in FIGS. 6, 7 and 8.

In its normal closed position (FIGS. 6 and 7), the retaining member 62 forms a horizontal extension of the module floor 50 so that the articles 14 can move smoothly and without hindrance from the module 13 into the releasing mechanism 56. The articles 14 are prevented from moving out through the front of the releasing mechanism 56 by the cowl 60 and by a vertical lip 72 that extends upwardly along the front edge of the retaining member 62.

When an article 14 is to be dispensed, the retaining member 62 is pivoted into an article releasing position (shown in FIG. 8), in which it is inclined downwardly from the front edge of the module floor 50, by energizing a solenoid 76 (best shown in FIGS. 3, 7 and 8), mounted on the underside of the module 13. In the case of a vending machine, the appropriate solinoid energizing circuitry (not shown) may be responsive to the deposit of coins in the conventional manner.

The solenoid 76 includes a plunger 78 normally biased by a coil spring 80 toward a forwardly extending position and connected by a link 82 to a projection 84 on the underside of the retaining member 62. Upon energization of the solenoid 76, the plunger 78 is withdrawn, moving backwardly along the longitudinal center axis of the module 13, and the link 82 causes the retaining member 62 to pivot about the pins 64 into releasing position, allowing the leading article 14 to move out from under the cowl 60 and over the lip 72.

The releasing mechanism 56 also includes an ejector bail 85 (FIGS. 6, 7 and 8), that provides for positive ejection of the dispensed articles 14. The bail 85 includes two generally vertical side pieces 86 pivotally attached at their lower ends to the retaining member 62 near its swingable forward end. At their top ends, the side pieces 86 are connected by a horizontal ejecting bar 88 (FIG. 5) which rides, at each end, in a slot 90 in one of the sidewalls 58. As the retaining member 62 moves to its open position, the ejecting bar 88 is pulled downwardly by the side pieces 86, engaging the top of the leading article 14 pushing it downwardly.

As the article 14 drops, it is deflected outwardly and away from the front edge of the retaining member 62 by a pair of stationary guide fingers 96 extending from the compartment floor 50. The guide fingers 96 projects forwardly and downwardly at an angle of approximately 45 degrees and the retaining member 62 is provided with slots (not shown) that allow the fingers to pass through the retaining member as it pivots.

An alternative form of the releasing mechanism is described and illustrated in U.S. Pat. No. 3,722,745 entitled "Modular Vending Machine Having Trap-Door Ejection Mechanism".

Since the modules 13 that contain the articles 14 to be dispensed are oriented horizontally, the force of gravity does not advance the articles, and it is necessary to provide a feed mechanism for urging them toward the releasing mechanism 56. In the present invention, this feed mechanism is simple, requires very little space and is easily assembled, but is nevertheless reliable, readily replaceable, relatively jam free, and can be latched in an inoperative position while the machine is being loaded. Other advantages of the feed mechanism are that it guides the articles smoothly along the compartments 13 with a minimum of friction and a constant force and does not interfere with loading of the modules from the top.

There is a separate feed mechanism for each module 13 comprising a carriage 120 (best shown in FIGS. 4, 7 and 8) that is movable along the module pushing the articles 14 before it and a spring mechanism 121 (FIG. 5) that drives the carriage. Forming the front end of the carriage 120 is a vertical pusher plate 122 transversely oriented with respect to the module 13 to engage the last article 14 from behind and urge it toward the releasing mechanism 56. The pusher plate 122 is supported by a carriage frame 123 that has sufficient width to extend across the interior of the module 13.

The carriage 120 also includes a drive wheel 124 with a soft deformable outer layer, in the form of a rubber tire 125, that frictionally engages the track 54 on the module floor 50. A square-ended, non-rotatable axle 126 extends across the carriage 120 to position the wheel 12. On either side of the carriage 120 are two rollers 128 that ride in the guide channels 55 of the module 13. The height of the rollers 128 with respect to the wheel 124 is such that the rollers, bearing against the horizontal top surfaces 130 of the channels 50, force the wheel 124 downwardly into firm contact with the gripping deformations of the track 54 so that the wheel will turn rather than slide as the carriage 120 moves in either direction.

The drive spring mechanism 121 takes the form of a spiral wound resilient metal tape that tends to unwind when unrestrained. Springs of this type are sometimes referred to as ribbon springs. The end 134 of the spring 121 at the center of the spiral is secured within a slot in the non-rotatable axle 126 while its outer end 136 is connected to a lug 138 on the side of the wheel 124 spaced from its center. As the wheel 124 turns, the spring 121 is either wound or unwound, depending upon the direction of carriage movement. Thus the spring 121 is wound when the carriage 120 is pushed to the rear of the module 13, but, when the carriage 120 is released, the spring urges it toward the front of the compartment and the releasing mechanism 56. As the carriage 120 moves forward it pushes the artcles 14 before it as they slide on the ridge 55 which supports them above the track 54.

It is a characteristic of springs of the above type that the unwinding force remains substantially constant regardless of the extent to which the spring is tightened at any particular time. An exemplary spring of this type is described in U.S. Pat. No. 2,855,534 entitled "Reverse Spring Wound Motor."

Each module 13 includes a latch mechanism formed by a latch bar 138 that extends horizontally across the rear of the module and a cooperating L-shaped latch member 139 that is pivotably mounted on the rear of the frame 123 of the corresponding carriage 120. A spring 140 biases the L-shaped member 139 toward a position in which one leg 141 extends horizontally and to the rear and the other leg 142 extends vertically and upwardly. On the rear of the horizontal leg 141 is a downwardly facing hook 143 that carries a caming surface 144.

When the carriage 120 is pushed to the rear of the module 13, the horizontal leg 141 is lifted when the caming surface 144 engages the bar 138, allowing the hook 143 to grasp the bar (as best shown in FIG. 3) and preventing the carriage 120 from moving toward the releasing mechanism 56 under the force of the drive spring 121. The carriage 120 can be unlatched by pushing the vertical leg 142 forward to rock the L-shaped member 139 so that the hook 143 disengages the bar 138.

An unlatching device is also provided in the form of stationary horizontal fingers 146 (FIG. 3) that project from the rear wall 23 of the cabinet 10, the forward ends of the fingers forming inclined abutment surfaces 148. When a drawer 12 is pushed into the cabinet 10 to its loading position, the abutment surfaces 148 engage the complimentarily inclined caming surfaces 144 of the hooks 143, thus causing the L-shaped latch members 139 to pivot and disengage the bars 138 so that the carriages 120 are released and free to move toward the releasing mechanisms 56. The unlatching fingers 146 are not only a convenience, eliminating the need to individually unlatch each carriage 120, but they insure that the carriages will not be inadvertently left in a latched condition, preventing the articles 14 from being dispensed.

A feature of the invention of particular importance when cigarette packages are to be dispensed relates to the provision of transparent plastic window panels 152 that form the forward portions of the module floors 50 adjacent the releasing mechanism 56 and integrally formed with the guide fingers 96. To comply with various state laws, the tax stamps on the bottom ends of a certain number of packages 14 at the front of each module 13 must be visible without removing the packages from the machine. The window panels 152 permit these tax stamps to be viewed.

The length of the window panels 152 depends upon the number of the tax stamps required to be displayed in a particular jurisidication but at the present time the maximum number required is three. The machine can be so constructed that the pusher plate 122 of the carriage 120 extends far enough ahead of wheel 124 that the last article 14 can be dispensed without the wheel 124 moving off the front end of the knurled track 54 onto the window panel 152 and losing traction. Ridges (not shown) are formed on the top surface of the window panels 152 to continue to the front end of each module 13 the ridges 55 that extend along the tracks 54.

It would be possible, as an alternative to the construction described above, to use a simple opening instead of the transparent panel 152 to form the window, but the use of the transparent panel as part of the floor 50 is preferred because it provides better support for the packages at the front ends of the modules without obstructing the view of the tax stamps.

An advantage of the invention that should not be overlooked is that the releasing mechanisms 56 have open front ends which permit the articles 14 to be seen through the transparent front door 30 of the cabinet 10. It is therefore possible for a prospective purchaser to view directly the article 14 that will be dispensed when he makes his selection. The purchaser, therefore, has direct knowledge of what products are available and cannot be misled if, for example, one brand of cigarettes is inadvertently placed in a module intended for another. In conventional cigarette vending machines, the purchaser must assume that the machine has been loaded properly and that the desired product will be dispensed. Moreover, the ability to display the actual product to be sold is a positive motivating factor in mechandising.

Another advantage of the machine is that its construction lends itself to inexpensive manufacture and greatly improved sevriceability. Not only are the releasing mechanisms 56 and carriages 120 readily removed from the modules 13, but each module is removable from the corresponding drawer 12 by simply lifting it. The modules 13 are normally held in place by locating pins 154 that project upwardly from the drawers 12 into apertures in the module floors 50 at the rear and by electrical jacks 156 that project downwardly from the modules into receptacles 158 in the drawers near the solenoids 76.

It will be appreciated from the foregoing that the invention provides a relatively trouble free dispensing machine in which the articles 14 to be dispensed are moved horizontally along the modules 13 by a substantially constant spring force and the proportion of the space consumed by the machine that is available for storage of merchandise is relatively high. The modules 13 are readily accessible for loading from the top, since they are arranged on movable drawers 12, and new articles 14 can be added behind those already in place so that articles inserted first will be dispensed first. It is not necessary to manually oppose the force of the spring 121 when loading, due to the latching feature.

While a particular form of the invention has been illustrated and described, it will be apparent that various modifications can be made without departing from the spirit and scope of the invention.

We claim:

1. A dispensing machine comprising:

a module in which articles to be dispensed can be arranged in a row;

releasing means disposed at one end of said module for releasing said articles sequentially upon actuation thereof;

a carriage movable along said module for advancing said articles toward said releasing means, said carriage including a non-rotatable structure and a drive wheel rotatably connected to said non-rotatable structure; and spring means mounted on and carried in its entirety by said carriage for driving said carriage toward said releasing means, said spring means being connected to said non-rotatable structure and said drive wheel to be wound by rotation of said drive wheel in one direction and unwound by rotation of said drive wheel in another direction.

2. The dispensing machine of claim 1 wherein said spring is an elongated metal tape wound in a spiral.

3. The dispensing machine of claim 1 wherein said spring is an elongated metal tape wound in a spiral, the unwinding force of said spring being substantially constant regardless of the position of said carriage.

4. The dispensing machine of claim 1 wherein said module includes a track formed by gripping deformations arranged for engagement by said wheel.

5. The dispensing machine of claim 1 wherein said module includes a floor having a window therein adjacent said releasing means whereby the bottom ends of said articles disposed within said modules can be viewed.

6. The dispensing machine of claim 1 further comprising latching means for restraining said carriage against the force of said spring means.

7. The dispensing machine of claim 6 wherein said latching means comprises:

a first latch member pivotably mounted on said carriage; and a second latch member attached to said module and positioned to be releasably engaged by said first latch member.

8. The dispensing machine of claim 6 further comprising means for unlatching said latching means to permit movement of said carriage when said module assumes a predetermined position.

9. A dispensing machine comprising:

a cabinet;

a plurality of drawers movable between an operating position within said cabinet and a loading position projecting from said cabinet, each of said drawers including a plurality of parallel substantially horizontal modules in which articles to be dispensed can be arranged in a row, and each of said modules having a floor, side walls and an open top, whereby said modules can be loaded from above said drawers are in said loading positions;

a plurality of releasing means disposed at the front ends of said modules for releasing said articles sequentially;

a plurality of carriages each movably disposed within one of said modules to advance said articles toward said releasing means, each of said carriages including a non-rotatable structure and a drive wheel rotatably connected to said non-rotatable structure; and a plurality of spring means each mounted on and carried in its entirety by one of said carriages for driving said carriages toward said releasing means, each of said spring means being connected to said non-rotatable structure and said drive wheel of a corresponding one of said carriages to be wound by rotation of said drive wheel in one direction and unwound by rotation of said drive wheel in another direction.

10. The dispensing machine of claim 9 wherein each of said modules includes a track formed by gripping deformations arranged for engagement by said drive wheel of the corresponding carriage.

11. The dispensing machine of claim 9 wherein:

said floor of each of said modules includes a drive wheel track formed by gripping deformations extending therealong, and said side walls of said module extend upwardly from said floor and form a pair of guide channels extending therealong; and each of said carriages includes a plurality of guide rollers in engagement with the corresponding guide channels, and said drive wheel of said carriage engages said track.

12. The dispensing machine of claim 9 wherein each of said spring means is an elongated metal tape wound in a spiral.

13. The dispensing machine of claim 12 wherein said non-rotatable structure of each of said carriages includes a non-rotatable pin extending crosswise with respect to the corresponding module, a corresponding one of said tapes being wound about said pin.

14. The dispensing machine of claim 9 wherein:

each of said drive wheels has a soft deformable exterior arranged to roll along the corresponding module; and said module includes a track formed by gripping deformations and arranged for engagement by said wheel.

15. The dispensing machine of claim 14 wherein each of said carriages further includes a plurality of guide rollers arranged to hold said drive wheel in engagement with said track.

16. The dispensing machine of claim 9 wherein said module floor includes a window therein adjacent said releasing means whereby the bottom ends of said articles disposed within said modules can be viewed.

17. The dispensing machine of claim 9 further comprising a plurality of latching means for restraining said carriages against the forces of said spring means.

18. The dispensing machine of claim 17 wherein each of said latching means comprises a first latch member pivotably mounted on one of said carriages and a second latch member attached to the corresponding module and positioned to be releasably engaged by said first latch member.

19. The dispensing machine of claim 17 further comprising means for unlatching said latching means to permit movement of said carriage when said module assumes a predetermined position, said unlatching means comprising a plurality of abutment surfaces connected to and supported by said cabinet.

20. A machine for dispensing cigarette packages comprising:

a cabinet having a transparent openable front door;

a plurality of drawers stacked one above the other and movable between operating positions within said cabinet and loading positions projecting from said cabinet, each drawer including a plurality of parallel substantially horizontal modules in which cigarette packages to be dispensed can be arranged in a row one behind the other with the tax stamps of said packages facing downward, and each of said modules having a floor, two sidewalls and an open top whereby said modules can be loaded from above when said drawers are in said loading positions, each of said modules being roll formed and having a track formed by gripping deformations extending along its floor and guide channels extending along its sidewalls;

a plurality of releasing means disposed at the front ends of said modules and opposing said door for releasing said packages sequentially, each of said releasing means having an open front end whereby said packages can be viewed through said door prior to being dispensed;

a plurality of carriages, each movably disposed within one of said modules to advance said articles towards one of said releasing means, each of said carriages including a drive wheel having a soft deformable exterior layer arrangement to roll along the corresponding module track as said carriage moves within said module, and a plurality of rollers engaged with said guide channels so as to hold said drive wheel in firm contact with said tracks; and a plurality of spring means each mounted on and carried by one of said carriages for driving said carriages toward said releasing means, each of said spring means comprising an elongated metal tape wound in a spiral;

each of said carriages including a non-rotatable pin extending crosswise with respect to the corresponding module with the corresponding spring attached to said pin.

21. A dispensing machine comprising:

a module in which articles to be dispensed can be arranged in a row;

releasing means disposed at one end of said module for releasing said articles sequentially upon actuation thereof;

a carriage movable along said module for advancing said articles toward said releasing means;

spring means mounted on and carried by said carriage for driving said carriage toward said releasing means and thereby advancing said articles toward said releasing means;

said carriage including at least one wheel having a soft deformable exterior surface arranged to roll along said module as said carriage moves within said module, said spring means being drivingly connected to said wheel; and said module including a track formed by gripping deformations arranged for engagement by said wheel.

22. The dispensing machine of claim 21 wherein said spring is an elongated metal tape wound in a spiral.

23. The dispensing machine of claim 21 wherein said carriage further includes a plurality of guide rollers arranged to hold said drive wheel in engagement with said track.

24. A dispensing machine comprising:

a module in which articles to be dispensed can be arranged in a row;

releasing means disposed at one end of said module for releasing said articles sequentially upon actuation thereof;

a carriage movable along said module for advancing said articles toward said releasing means;

spring means mounted on and carried by said carriage for driving said carriage toward said releasing means and thereby advancing said articles toward said releasing means;

said module including a floor having a track extending therealong, a pair of side walls extending upwardly from said floor and a pair of guide channels extending along said side walls; and said carriage including a drive wheel having a soft deformable gripping surface in engagement with said track, and a plurality of guide rollers in engagement with said guide channels and positioned to hold said drive wheel in firm contact with said track.

* * * * *